Sept. 10, 1968    R. RUPRECHT ET AL    3,400,600
VARIABLE-PITCH SHEAVE

Filed May 18, 1967    2 Sheets-Sheet 1

INVENTORS
ROBERT RUPRECHT
FALKO HAMM
BY Michael S. Striker
their ATTORNEY

United States Patent Office 3,400,600
Patented Sept. 10, 1968

3,400,600
VARIABLE-PITCH SHEAVE
Robert Ruprecht, Aichelberg, and Falko Hamm, Sindelfingen, Germany, assignors to Ernst Heinkel Aktiengesellschaft, Stuttgart-Zuffenhausen, Germany
Filed May 18, 1967, Ser. No. 639,353
Claims priority, application Germany, May 26, 1966,
H 59,523
15 Claims. (Cl. 74—230.17)

ABSTRACT OF THE DISCLOSURE

The reciprocable flange of a variable-pitch sheave is mounted on the main shaft or on a series of axially parallel guide rods by means of pairwise arranged antifriction bearings having outer races whose radial clearance with reference to the peripheral surface of the main shaft or the respective guide rod is slightly greater than the radial clearance between the annuli of balls in the respective bearings and the peripheral surface. This insures that the outer races cannot damage the peripheral surface but can scrape off foreign matter in response to axial movement of the flange, and simultaneously prevent escape of lubricant from or entry of foreign matter into the bearings.

BACKGROUND OF THE INVENTION

The present invention relates to improvements in mounting of axially reciprocable parts on shafts, guide rods or analogous structures, particularly to improvements in the mounting of axially reciprocable flanges on the main shafts or guide rods of variable-pitch sheaves.

Infinitely variable belt transmissions normally comprise two variable-pitch sheaves each of which includes an axially fixed and an axially movable flange. One of the movable flanges is displaced whenever the operator wishes to change the ratio of the transmission whereby the belt automatically changes the axial position of the other movable flange.

When the movable flange of a variable-pitch sheave dwells in a certain axial position for extended periods of time, i.e., when the ratio of the belt transmission remains constant, foreign matter which deposits on the sheaves is likely to attack the peripheral surfaces of main shafts or guide rods which support the movable flanges for axial movement. This phenomenon is known as galling or fretting corrosion and reduces the useful life of variable-pitch sheaves. Accumulations of foreign matter are particularly undesirable at both axial ends of the movable flange, and such accumulations are often due to minute axial reciprocatory movements of movable flanges which are due to unavoidable differences in the width of the endless belt. Such differences in width of the belt are due to inaccuracies in machining, uneven stretching and/or uneven wear when the transmission is in use. As the movable flange reciprocates in response to differences in width of the belt, its axial ends tend to pile up foreign matter which deposits on the main shaft or guide rods. In many instances, the accumulations of foreign matter are so extensive that they prevent larger axial displacements of the movable flange. In other words, such accumulations can prevent changes in the ratio of the transmission because the foreign matter will incrustate and will adhere to the main shaft or to the guide rods with a force which cannot be overcome by the spring which urges the movable flange against the adjoining side of the belt. This can result in rapid destruction of the belt.

Attempts to prevent the formation of fretting corrosion or galling include the provision of special bearings between the movable flange and the main shaft of a variable-pitch sheave. In accordance with one of several presently known proposals, the movable flange is mounted on a very large number of relatively small balls which are disposed in several rows or annuli surrounding the peripheral surface of the main shaft. A drawback of such bearings is that they are very expensive because they utilize a large number of balls, and also that the balls are likely to damage the peripheral surface of the main shaft. Large balls cannot be used in such bearings because they would unduly increase the dimensions of the bearing. Another solution which is disclosed in U.S. Patent No. 3,237,471 to Wunsch proposes the use of bearings which comprise annuli of helical convolutions. These prior proposals are satisfactory when the peripheral surface of the main shaft is not coated with a film of lubricant. However, even though such conventional bearings reduce the likelihood of galling, they are too expensive for many applications of variable-pitch sheaves and they cannot be used in sheaves which must withstand very high stresses, for example, in sheaves which are used in heavy-duty agricultural machines. Still further, such known bearings leave very little room for lubricant.

Accordingly, it is an important object of the present invention to provide a novel bearing for use in variable-pitch sheaves or like devices wherein an axially movable flange or like member travels back and forth along one or more cylindrical peripheral surfaces, and to construct and assemble the bearing in such a way that it can accommodate large quantities of lubricant, that it effectively prevents fretting corrosion or galling of peripheral surfaces, and that it can prevent penetration of foreign matter into its interior even if the sheave is used outdoors for extended periods of time.

Another object of the invention is to provide a novel and improved variable-pitch sheave which can be used with advantage in heavy-duty agricultural machines including harvesters, threshers and others.

A further object of the invention is to provide a variable-pitch sheave wherein the bearings themselves prevent entry of foreign matter into their interior and wherein such bearings comprise a relatively small number of parts.

An additional object of the invention is to provide a variable-pitch sheave which utilizes a small number of rolling elements.

SUMMARY OF THE INVENTION

Our present invention is embodied in a structure which preferably constitutes a variable-pitch sheave and comprises a first member which may form the main shaft or a guide rod of the sheave and has a cylindrical peripheral surface, a second member which may form the reciprocable flange of the sheave and is movable axially along the first member whereby its internal cylindrical surface spacedly surrounds the peripheral surface, a pair of antifriction bearings provided between the two surfaces and each comprising an outer race surrounding the peripheral surface with a first radial clearance and an annulus of rolling elements surrounding the peripheral surface with a second radial clearance which is only slightly less than the first clearance, and spacer means interposed between the two bearings.

The outer races and/or the adjoining portions of the second member are provided with scraping edges which remove foreign matter from the peripheral surface when the second member moves axially of the first member. Such scraping edges cannot cause galling or fretting corrosion of the first member because their radial clearance exceeds the radial clearance of the annuli of rolling elements.

Each bearing further comprises a second or inner race which preferably resembles a disk clamped between the aforementioned spacer means and a portion of the respective outer race. The inner races may be provided with cutouts to form passages for admission of lubricant from a central compartment between the inner races into outer compartments which accommodate the rolling elements. The outer races have internal grooves for sealing elements which prevent escape of lubricant from the outer compartments and/or entry of foreign matter into such outer compartments.

The novel features which are considered as characteristic of the invention are set forth in particular in the appended claims. The improved variable-pitch sheave itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
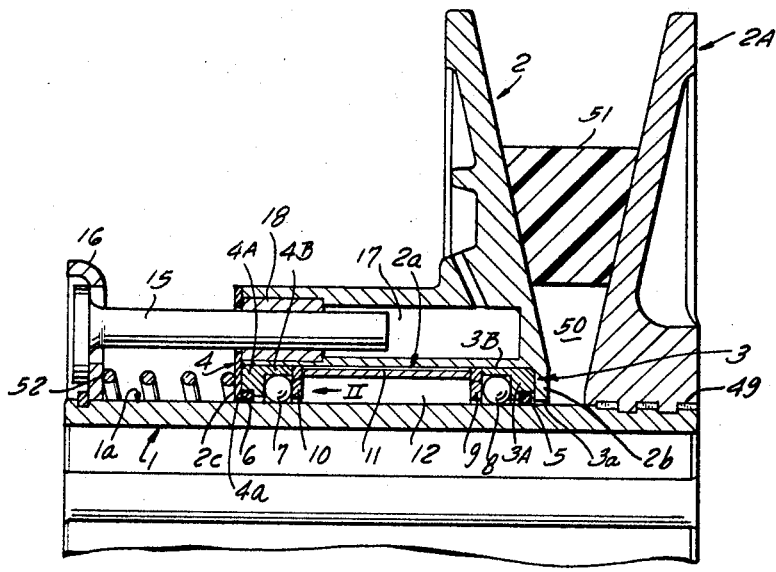
FIG. 1 is a fragmentary axial sectional view of a variable-pitch sheave which embodies one form of our invention.

FIG. 1 illustrates a portion of a variable-pitch sheave which comprises three main components, namely, a first member 1 which constitutes a driven shaft and has a cylindrical peripheral surface 1a, a movable second member 2 which constitutes one flange of the sheave and is reciprocable axially of the shaft 1, and a third member 2A which constitutes the other flange of the sheave and is fixedly secured to the shaft 1 as shown at 49. The flanges 2, 2A define between themselves a radially outwardly tapering gap 50 which receives a V-belt 51. The movable flange 2 has a cylindrical internal surface 2a which spacedly surrounds the peripheral surface 1a to define therewith an annular chamber for two axially spaced cageless antifriction bearings and a sleeve-like spacer 11 which is disposed between the disk-shaped inner races 9, 10 of the bearings. The bearings further comprise outer races 3, 4 and annuli of antifriction rolling elements in the form of balls 8 and 7, respectively. The right-hand bearing is adjacent to one axial end of the flange 2 and its outer race 3 is held against rightward movement with reference to the flange 2 by a radially inwardly extending collar 2b. The outer race 4 of the left-hand bearing is adjacent to the left-hand axial end of the flange 2 and the latter carries a suitable disk-shaped retainer 2c which holds the left-hand outer race 4 against leftward movement with reference to the flange 2. The outer races 3, 4 are respectively provided with first annular portions 3A, 4A which surround the peripheral surface 1a with a very small first clearance (such clearance was exaggerated in FIG. 1 for the sake of clarity) and second annular portions 3B, 4B which surround the respective balls 8, 7 in such a way that the annuli of balls 8, 7 are received between the peripheral surface 1a and the annular portions 3A, 4A with a second annular clearance which is only slightly less than the aforementioned clearance between the peripheral surface 1a and the annular portions 3A, 4A. These annular portions 3A, 4A or the parts 2b, 2c are respectively provided with scraping edges 3a, 4a which remove solid matter from the peripheral surface 1a when the flange 2 is caused to move axially along the shaft 1. Such axial movements of the flange 2 will be caused by the belt 51 or by a strong helical spring 52 which operates between the left-hand end of the flange 2 and a spring retainer 16 on the shaft 1.

Figure 2:
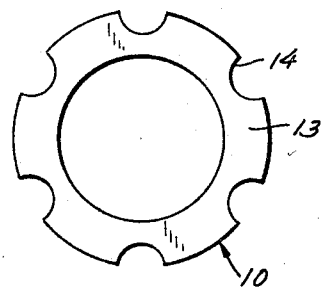
FIG. 2 is an enlarged plan view of an inner race in the sheave substantially as seen in the direction of the arrow II in FIG. 1.

The annuli of balls 8, 7 are disposed between the annular portions 3A, 4A, and the inner races 9, 10 are disposed between the annuli of balls 8, 7. The internal surfaces of the annular portions 3A, 4A are formed with annular grooves for sealing elements in the form of elastically deformable O-rings 5, 6 which bear against the peripheral surface 1a to prevent escape of lubricant and to prevent entry of foreign matter. Lubricant is stored in a central compartment 12 defined by the peripheral surface 1a, inner races 9, 10 and the internal surface of the spacer 11. The races 3, 9 and 4, 10 define two outer compartments which accommodate the respective balls 8, 7 and communicate with the central compartment 12 through passages formed by recesses or cutouts 14 provided in the peripheral faces of the inner races 9 and 10. The cutouts 14 of the inner race 10 are shown in FIG. 2. These cutouts are of substantially semicircular outline and are separated from each other by tongues or lips 13. When the shaft 1 rotates with the flanges 2, 2A, the races 3, 4, 9 and 10 share such rotary movement and the lubricant filling the central compartment 12 flows through the cutouts 14 of the inner races 9, 10 to lubricate the balls 8 and 7. The O-rings 5 and 6 prevent escape of such lubricant beyond the axial ends of the movable flange 2.

It will be noted that the two antifriction bearings are without cages for the balls 8 and 7. The second annular portions 3B, 4B of the outer races 3, 4 constitute stops for the inner races 9, 10 and maintain these inner races at such a distance from the annular portions 3A, 4A that the balls 8, 7 are movable axially of the flange 2 through distances which exceed the difference between the minimum and maximum width of the belt 51. The width of the belt 51 is nearly constant but varies nevertheless between a minimum and a maximum value due to machining tolerances, uneven stretching and/or uneven wear.

The flange 2 is further mounted on a series of parallel guide rods 15 (only one shown) which are anchored in the aforementioned spring retainer 16 and extend into open-ended blind holes 17 machined into the hub of the flange 2. The open ends of the holes 17 receive cylindrical guide sleeves 18. The retainer 16 is affixed to the shaft 1 and may comprise a series of radially extending arms each of which carries one of the guide rods 15.

Due to the fact that the axial play of balls 8 and 7 between the annular portions 3A, 4A and the respective inner races, 9, 10 exceeds the differences in width of the belt 51, the balls will invariably roll in response to such axial movements of the flange 2 which are due to irregularities in the width of the belt, at least at such times when the flange 2 is not shifted on purpose to change the ratio of the transmission which utilizes the sheave of FIG. 1.

The feature that the radial clearance between the internal surfaces of the annular portions 3A, 4A and the peripheral surface 1a exceeds only very slightly the radial play of balls 8 and 7 between the peripheral surface 1a and the annular portions 3B, 4B, the scraping edges 3a, 4a can effectively prevent deposition of dirt on the exterior of the shaft 1 and such scraping edges also prevent so-called fretting corrosion or galling of the peripheral surface 1a. The O-rings 5 and 6 perform the dual function of preventing penetration of dust or other foreign matter into the outer compartments which accommodate the balls 8 and 7, and of confining lubricant which enters such outer compartments from the central compartment 12 through the cutouts 14 of the inner races 9 and 10.

The shaft 1 preferably consists or hardened rustproof steel or an equivalent high-quality metal. It is often sufficient to harden only the material which is adjacent to the peripheral surface 1a of the shaft 1. At least the internal surfaces of the annular portions 3A, 4A of the outer races 3, 4 are preferably coated with layers of corrosion-resistant material. It is also possible to produce each of the outer races entirely of a high-quality rustproof steel or an equivalent alloy. As a rule, all exposed surfaces of the outer races (with the possible exception of the surfaces bounding the grooves for the O-rings 5 and 6) will be coated with wear- and corrosion-resistant material. The same applies for the surfaces along the scraping edges 3a, 4a. Since the outer races 3, 4 are rigid with the flange 2, the scraping edges 3a, 4a can be said to form part of the outer races or the outer races can be said to form part of the flange 2.

Figure 3:
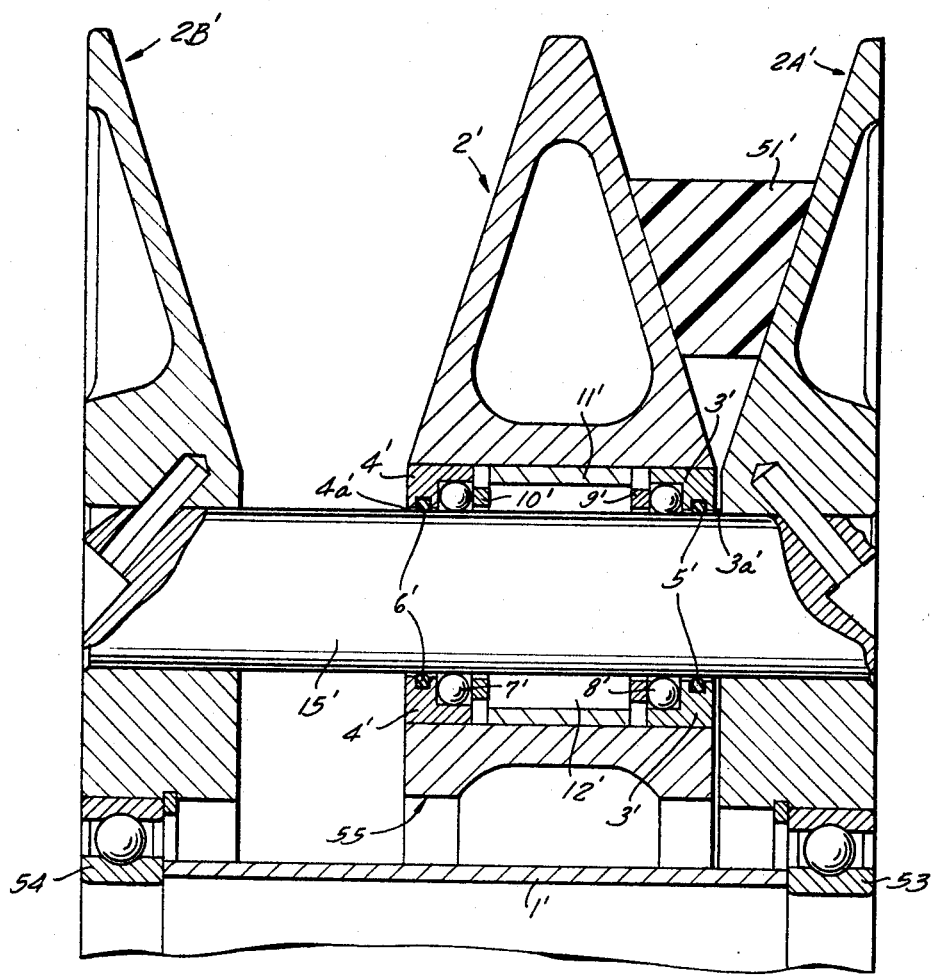
FIG. 3 is a fragmentary axial sectional view of a modified variable-pitch sheave wherein the movable flange is reciprocable along a series of guide rods.

FIG. 3 illustrates a portion of a heavy-duty variable-pitch sheave wherein the parts analogous to those shown in FIGS. 1 and 2 are denoted by similar reference numerals each followed by a prime. The main shaft 1' is stationary and is provided with antifriction bearings 53, 54 for two axially fixed flanges 2A', 2B', disposed at the opposite sides of a reciprocable flange 2'. The latter is provided with a cutout 55 for the shaft 1' and is axially movably mounted on a series of axially parallel guide rods 15' (only one shown) each of which is analogous to the shaft 1 of FIG. 1 and carries two antifriction bearings corresponding to the bearings shown in FIG. 1. The ends of the guide rods 15' are mounted in the flanges 2A', 2B'. The sheave of FIG. 3 may be used in harvester threshers and similar heavy-duty agricultural machines. In the illustrated embodiment, the belt 51' travels in the gap between the flanges 2' and 2A'. Due to the fact that the flange 2' is mounted only on the guide rods 15', the moments of forces acting upon the flanges 2' and 2A' when the sheave of FIG. 3 is in actual use are smaller than if the flange 2' were mounted directly on the main shaft 1'.

The outer races 3', 4' of the bearings between the flange 2' and guide rod 15' of FIG. 3 are press-fitted into the through bore of the flange 2' so that the latter need not be provided with a collar 2b and disk 2c as shown in FIG. 1. In FIG. 3, the edges 3a', 4a' are provided directly on the outer races 3', 4'.

The diameters of the balls 7, 8 and 7', 8' are preferably large which is in contrast to certain conventional variable-pitch sheaves wherein the movable flange is mounted on a large number of annuli consisting of small-diameter balls which produce high Hertzian pressures and are likely to bite into the peripheral surface of the main shaft or guide rod. Also, such small balls will undergo deformation in response to relatively low compressive stresses. Moreover, the sheave of our present invention is less expensive than the just mentioned conventional sheaves because it utilizies a greatly reduced number of balls.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptions should and are intended to be comprehended within the meaning and range of equivalence of the claims.

What is claimed as new and desired to be protected by Letters Patent is set forth in the appended claims.

We claim:
1. In a structure of the character described, particularly in a variable-pitch sheave, a combination comprising a first member having a cylindrical peripheral surface; a second member axially movable along said first member and having an internal surface spacedly surrounding said peripheral surface; a pair of antifriction bearings provided between said surfaces, each of said bearings comprising a race surrounding said peripheral surface with a first radial clearance and an annulus of rolling elements surrounding said peripheral surface with a second radial clearance which is slightly less than said first clearance; and spacer means interposed between said bearings.

2. A combination as defined in claim 1, wherein said races comprise first annular portions which surround said peripheral surface with said first clearance and second annular portions which surround the respective annuli, said rolling elements being constituted by balls and said annuli being disposed between said first annular portions.

3. A combination as defined in claim 1, wherein said rolling elements are constituted by balls and wherein each of said outer races comprises an annular portion surrounding said peripheral surface with said first clearance and provided with a scraping edge arranged to remove foreign matter from said peripheral surface in response to axial movement of said second member, said annuli being disposed between said annular portions.

4. A combination as defined in claim 3, wherein said bearings further comprise inner races disposed between said annuli and wherein spacer means is disposed between said inner races.

5. A combination as defined in claim 4, wherein each of said inner races is provided with at least one cutout and wherein said inner races define with said members a central lubricant-containing compartment and said inner races define with said first member and the respective annular portions a pair of outer compartments each of which accommodates one of said annuli and receives lubricant from said central compartment through the cutout of the respective inner race.

6. A combination as defined in claim 4, wherein each of said first mentioned races further comprises a second annular portion which surrounds the respective annulus and constitutes a stop for the respective inner race.

7. A combination as defined in claim 4, wherein said second member constitutes the movable flange of a variable-pitch sheave and further comprising an endless belt cooperating with said moveable flange and having a width which varies between a minimum and a maximum value, the races of each of said bearings defining between themselves a compartment wherein the respective rolling elements are movable axially of said first member with a clearance which is greater than the difference between said minimum and maximum values.

8. A combination as defined in claim 4, wherein each of said annular portions is provided with an internal surface having an annular groove, and further comprising a sealing element received in each of said grooves and engaging said peripheral surface.

9. A combination as defined in claim 8, wherein said sealing elements are constituted by O-rings.

10. A combination as defined in claim 4, wherein each of said first mentioned races defines with the respective inner race an annular outer compartment for the respective annulus of balls and wherein said spacer means defines with said first member a lubricant-containing central compartment disposed between said inner races and communicating with said outer compartments through passages provided in said inner races.

11. A combination as defined in claim 10, wherein said second member constitutes an axially movable rotary flange of a variable-pitch sheave and wherein said inner races are arranged to rotate with said flange so that said central compartment admits lubricant to said outer compartments under the action of centrifugal force when said flange rotates.

12. A combination as defined in claim 1, wherein said first member is constituted by a shaft or rod and wherein at least that portion of said first member which is immediately adjacent to said peripheral surface consists of hardened rustproof steel.

13. A combination as defined in claim 12, wherein said second member constitutes the movable flange of a variable-pitch sheave and wherein said flange is coaxial with said first member.

14. A combination as defined in claim 1, wherein said races have internal surfaces provided with annular grooves and further comprising O-rings received in said grooves and sealingly engaging said peripheral surface, at least said internal surfaces of said races being coated with a corrosion-resistant material.

15. A combination as defined in claim 1, wherein said second member constitutes the movable flange of a variable-pitch sheave and wherein said sheave further comprises a main shaft which is coaxial with said flange and a fixed flange coaxially secured to said main shaft adjacent to one side of said movable flange, said first member constituting one of a series of guide rods parallel with said main shaft, said movable flange being reciprocable axially along said guide rods.

References Cited

UNITED STATES PATENTS

| | | |
|---|---|---|
| 2,640,365 | 6/1953 | Michie. |
| 2,812,666 | 11/1957 | Huck. |
| 2,952,161 | 9/1960 | Williams. |
| 3,044,315 | 7/1962 | Duhamel. |
| 3,094,320 | 6/1963 | Huck. |

C. J. HUSAR, *Primary Examiner.*